Dec. 21, 1943.                J. H. COOPER                2,337,294
                          FABRICATION METHOD
                          Filed Feb. 18, 1942
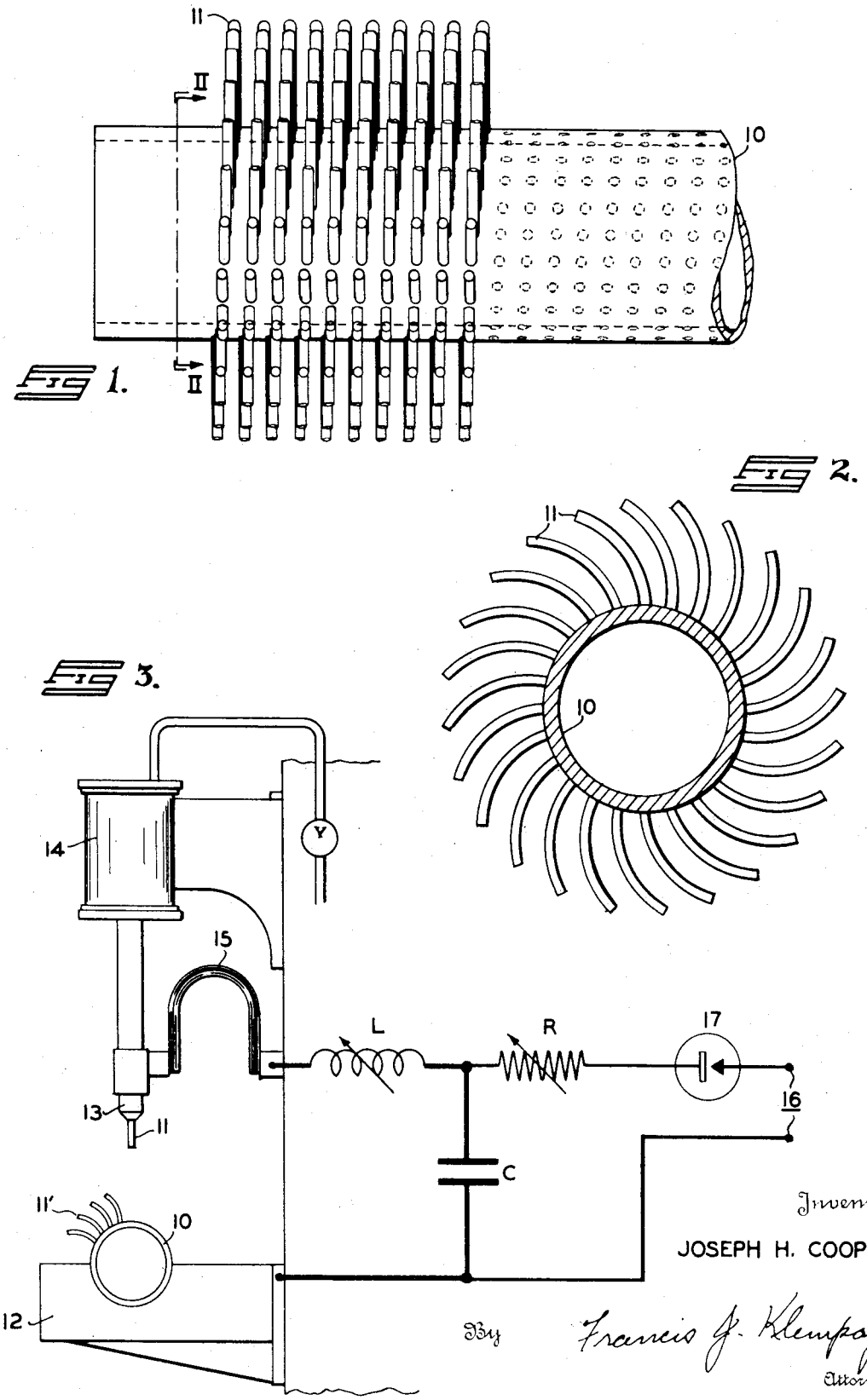
Inventor
JOSEPH H. COOPER
By Francis J. Klempay
Attorney Patented Dec. 21, 1943

2,337,294

UNITED STATES PATENT OFFICE 2,337,294

FABRICATION METHOD

Joseph H. Cooper, Warren, Ohio, assignor to The Taylor-Winfield Corporation, Warren, Ohio, a corporation of Ohio Application February 18, 1942, Serial No. 431,363

7 Claims. (Cl. 219—10)

This invention relates to the art of fabricating metal products particularly by the application of electric welding methods.

Substantial advances in the art of electric welding have shown how dissimilar metals can be readily welded and how welding, generally, can be accomplished with such efficiency that little or no metal of the pieces being joined is thrown out at the point of weld. These results are achieved normally by passing an electrostatic discharge through the pieces to be joined and in the electro-percussive method of welding as outlined in United States Patent #2,159,916, the discharge takes place while the pieces to be joined are being moved into engagement with each other. In this latter process the discharge begins across a gap between the pieces and, the discharge being oscillatory, the arc continues for one or two cycles before it is extinguished by physical contact between the parts. The energy of the arc, however, is sufficient to melt the surface molecules of the pieces so that when the pieces are brought into percussive engagement, a good permanent weld is effected.

The above described method is well suited for the purpose of attaching small parts onto larger pieces since the critical heating action is entirely localized on the surfaces of the joined pieces at or closely adjacent the point of weld. Thus the sections or physical characteristics of the component parts of the assembled structures are not affected in any manner.

In view of the above outlined advantages, it has been proposed to employ the electro-percussive method of welding for the purpose of securing projecting radiating members to high quality seamless tubing in the manufacture of high pressure heat exchanging apparatus. However, the use of the method has heretofore placed a limit on the spacing of the projections on the tubing since the high voltages employed would tend, during the welding cycle, to flash across from the projection being welded to the projection previously welded and thus nullify the welding effort.

In condenser powered welding equipment the total welding energy varies as the square of the voltage applied to the capacitor and to keep the size of the capacitor within practical limits, a high voltage is required. For example, in welding copper or aluminum studs, approximately 2 inches in length and $\frac{3}{32}$ inch in diameter, to the surface of 3 inch iron pipe, 5,000 volts may be required to be employed in a practical machine. As well understood in the art, welding by the electro-percussive method requires a holder or chuck to receive at least a portion of the stud or other object to be attached, the holder or chuck being operative to move the stud or other object into percussive engagement with the member to which it is to be attached and to conduct welding current therethrough. Heretofore these conditions precluded the manufacture of articles having a number of closely spaced projections attached to a base member by the subject welding method, which is otherwise admirably suited for the purpose, because of the difficulty of preventing flashing between the holder or chuck and the projections previously attached.

The primary object of the present invention is to provide a manufacturing method in which certain methods of welding may be employed to attach a number of closely spaced studs or projections to a base member. More specifically, the object is to enable welding methods requiring high voltages to be employed and this, of course, includes electro-percussive methods and other condenser powered methods.

The manner in which the above objects are accomplished in accordance with the invention will become apparent from the following specification considered in connection with the accompanying drawing wherein there is disclosed a preferred embodiment of the invention. Other objects and advantages of the invention will appear as the description proceeds.

In the drawing:

Figure 1 is a plan view of a portion of a heat exchanging tube constructed in accordance with the principles of the invention;

Figure 2 is a cross-section of the tube of Figure 1; and

Figure 3 is a schematic representation of a welding set-up which may be employed in carrying out the invention.

In the drawing, reference numeral 10 designates a length of steel pipe or tube, which as stated above may be of a high quality seamless type. To the outer surface of tube 10 is attached a multiplicity of studs or projections 11 preferably formed of copper, aluminum or other metal having a high coefficient of heat conductivity and in the illustration, the studs 11 are shown as being bent over and arranged spirally about the outer surface of the tube for purposes which will appear below.

Referring now to Figure 3, the tube 10 is shown as being supported in a fixed electrode 12 and one of the studs 11 is shown as being mounted in the chuck 13. The latter is arranged to be

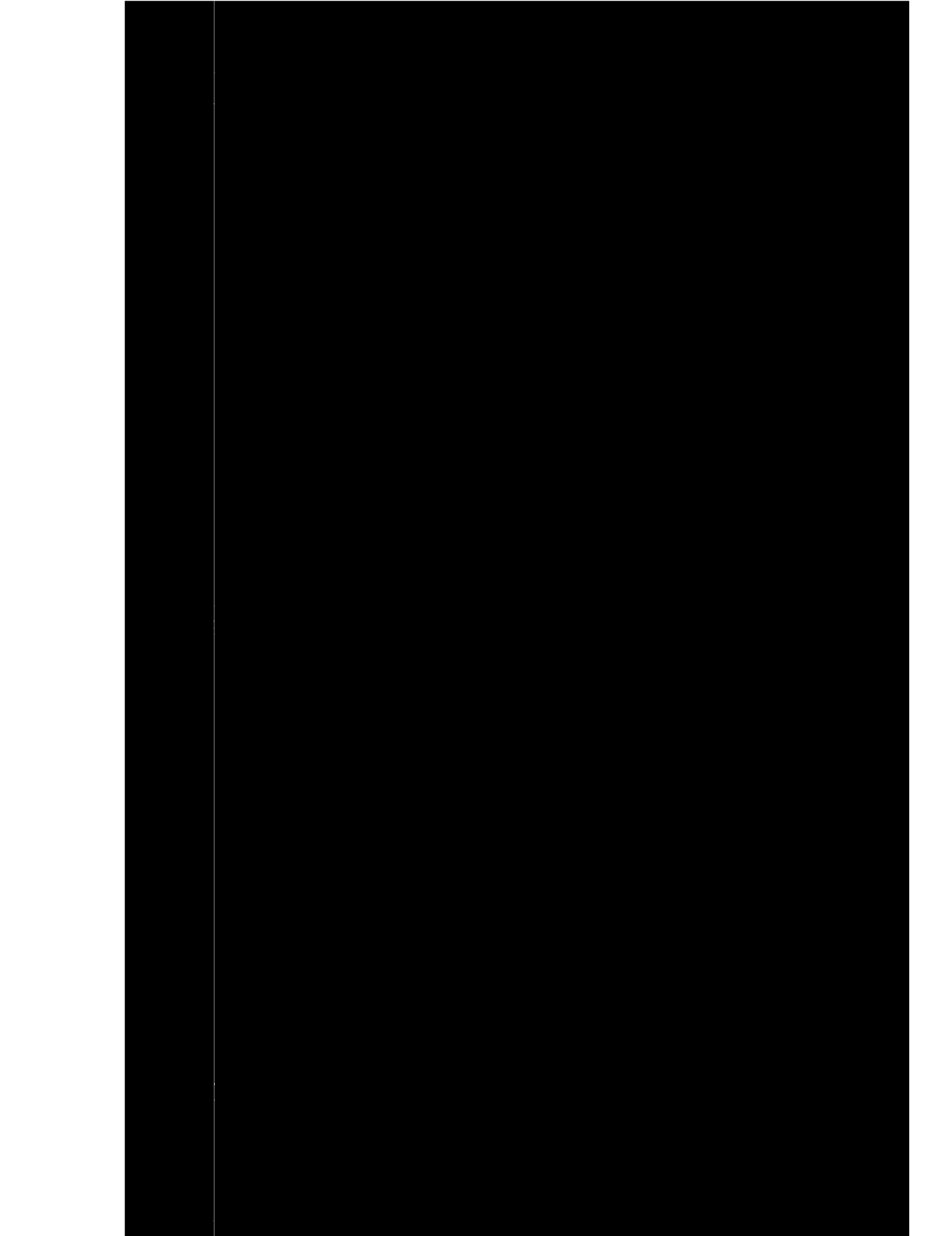

and a multiplicity of closely spaced metallic heat conducting studs projecting radially outward of said tube which consists of attaching said studs to said tube serially and spirally about said tube by the application of an electrostatic discharge method of welding wherein the studs are held by a chuck in pressure engagement with said tube while current resulting from an electrostatic discharge is caused to flow through the studs and tube, and bending over each successive stud attached before the next succeeding stud is welded whereby arcing between the chuck and/or the stud being attached and the stud or studs previously attached is avoided thus enabling said studs to be positioned closely together.

5. The method of making a heat exchanging device having a metallic fluid conducting tube and a multiplicity of closely spaced metallic heat conducting studs projecting radially outward of said tube which consists of attaching said studs to said tubes serially by the electro-percussive method of welding wherein the studs are held in a chuck and moved into engagement with said tube while an electrical potential exists between said tube and studs, and bending over each successive stud attached before the next succeeding stud is welded whereby arcing between the chuck and/or the stud being attached and the stud or studs previously attached is avoided thus enabling said studs to be positioned closely together.

6. The method of making a heat exchanging device having a metallic fluid conducting tube and a multiplicity of closely spaced metallic heat conducting studs attached to the outer surface of said tube and projecting radially outward therefrom and in which the metal of the studs has a higher coefficient of heat conductivity than the metal of the tube which consists of attaching said studs to said tube serially by an electrostatic discharge method of welding wherein the studs are held by a chuck in pressure engagement with said tube while current resulting from an electrostatic discharge is caused to flow through the studs and tube, and bending over each successive stud attached before the next succeeding stud is welded whereby arcing between the chuck and/or the stud being attached and the stud or studs previously attached is avoided thus enabling said studs to be positioned closely together.

7. The method of making a heat exchanging device having a metallic fluid conducting tube and a multiplicity of closely spaced metallic heat conducting studs projecting outwardly of said tube which consists of attaching said studs to said tube successively by the electro-percussive welding method wherein the studs are held in a chuck and moved into engagement with said base member while an electrical potential exists between said member and stud, moving said tube longitudinally and circumferentially after each successive welding operation whereby said studs are spirally arranged on said tube, and bending over each successive stud attached before the next succeeding stud is welded whereby arcing between the chuck and/or the stud being attached and the stud or studs previously attached is avoided thus enabling said studs to be positioned closely together.

JOSEPH H. COOPER.